US008791816B2

(12) United States Patent
Kelsey et al.

(10) Patent No.: US 8,791,816 B2
(45) Date of Patent: Jul. 29, 2014

(54) SITUATIONAL AWARENESS FOR AN ELECTRICAL DISTRIBUTION SYSTEM

(75) Inventors: William David Kelsey, Issaquah, WA (US); Richard N. Blair, Kent, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 13/169,966

(22) Filed: Jun. 27, 2011

(65) Prior Publication Data
US 2012/0326864 A1 Dec. 27, 2012

(51) Int. Cl.
G08B 1/08 (2006.01)
G01S 19/13 (2010.01)
G01S 19/20 (2010.01)
G05B 11/01 (2006.01)
G05D 3/12 (2006.01)

(52) U.S. Cl.
USPC ............ 340/539.13; 340/539.17; 340/539.11; 342/357.58; 342/357.51; 700/286; 700/22

(58) Field of Classification Search
CPC ....... G06Q 10/08; G06Q 10/06; G06Q 30/02; G06Q 30/0261; G06Q 10/087; G06Q 50/08
USPC .......................... 340/539.13, 539.17, 539.11; 342/357.06, 357.15; 700/286, 22
See application file for complete search history.

(56) References Cited

U.S. PATENT DOCUMENTS

| 6,178,362 | B1 * | 1/2001 | Woolard et al. ............... 700/295 |
| 6,633,900 | B1 | 10/2003 | Khalessi et al. |
| 6,894,609 | B2 * | 5/2005 | Menard et al. ................. 340/531 |
| 7,043,380 | B2 * | 5/2006 | Rodenberg et al. ............. 702/62 |
| 7,346,531 | B2 * | 3/2008 | Jacobs ......................... 705/7.15 |
| 7,624,033 | B1 | 11/2009 | Jean et al. |
| 7,825,793 | B1 * | 11/2010 | Spillman et al. ........... 340/539.1 |
| 8,059,006 | B2 * | 11/2011 | Schweitzer et al. .......... 340/635 |
| 8,325,057 | B2 * | 12/2012 | Salter ........................ 340/870.02 |
| 2006/0095385 | A1 * | 5/2006 | Atkinson et al. ................. 705/64 |
| 2006/0129691 | A1 | 6/2006 | Coffee et al. |
| 2007/0139191 | A1 * | 6/2007 | Quatro ..................... 340/539.13 |
| 2008/0284585 | A1 * | 11/2008 | Schweitzer et al. ....... 340/539.3 |

* cited by examiner

Primary Examiner — Daniel Wu
Assistant Examiner — Emily C Terrell
(74) Attorney, Agent, or Firm — Yee & Associates, P.C.

(57) ABSTRACT

A method and apparatus for managing events in an electrical distribution system. A number of events in the electrical distribution system are identified for an operator based on a profile for the operator. A wireless mobile device is assigned to the operator and the profile includes a role of the operator. The number of events is sent to the wireless mobile device assigned to the operator.

16 Claims, 13 Drawing Sheets

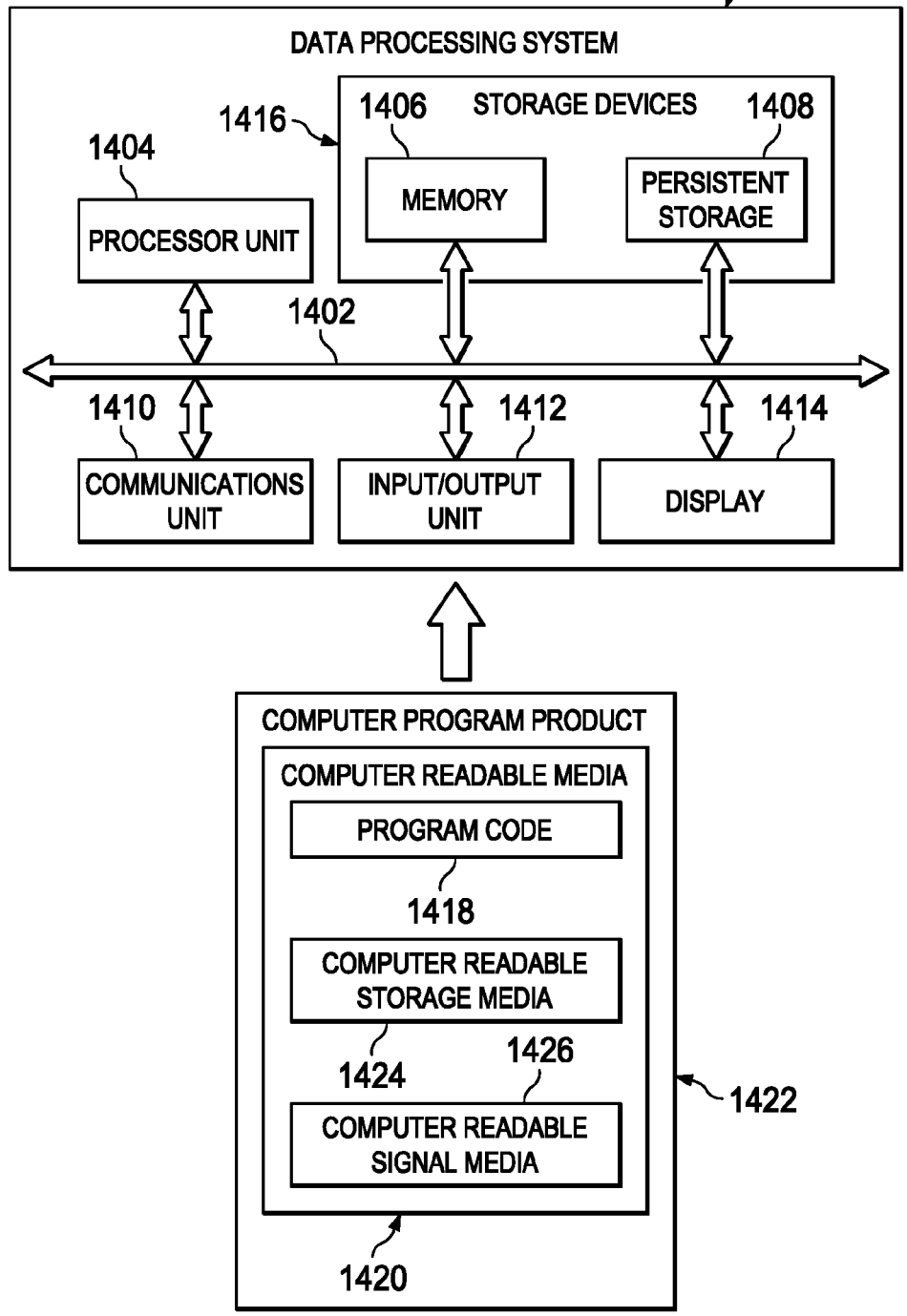

SITUATIONAL AWARENESS FOR AN ELECTRICAL DISTRIBUTION SYSTEM

BACKGROUND INFORMATION

1. Field

The present disclosure relates generally to electrical distribution systems and, in particular, to managing information for electrical distribution systems. Still more particularly, the present disclosure relates to a method and apparatus for exchanging information about an electrical distribution system between a mobile device and the electrical distribution system.

2. Background

Typically, electricity is generated by power generators at power plants. These power plants may take different forms. For example, the power plants may be fossil fueled power plants, nuclear power plants, geothermal power plants, solar power plants, wind based power plants, and/or other suitable types of power plants.

These power plants form an electrical generation system that is part of an electrical power system. The electrical power system is used to send electricity generated by the electrical generation system to consumers. An electrical power system includes other types of electrical systems in addition to the electrical generation system. For example, the electricity generated by the power plants is sent to an electrical distribution system over a transmission system. These two systems are examples of electrical systems in the electrical power system.

The electricity is received at electrical substations in the electrical distribution system from the transmission system. A consumer may be, for example, a residential consumer, an industrial consumer, a commercial consumer, a transportation consumer, or some other suitable type of consumer.

The delivery of electricity generated at a power plant to consumers may occur using any number of power generators, transformers, cables, switches, control units, circuits, transmission lines, sockets, and/or other suitable devices and/or structures in the electrical power system. Maintenance may need to be performed for one or more of these different devices and/or structures over time. For example, maintenance may need to be performed in a particular area in response to one or more outages of electric power occurring in the particular area. Oftentimes, operators may be unable to access information needed for performing the maintenance at the area as quickly as desired.

As a result, maintenance may not occur as fast as desired. This situation may result in some consumers being without power for longer periods of time than desired. Also, a loss of electrical power or inefficient transmission of electricity may occur when maintenance does not occur as fast as desired. These situations may reduce revenues to the companies and other organizations that operate different electrical systems in the electrical power system.

Therefore, it would be advantageous to have a method and apparatus that takes into account at least some of the issues discussed above, as well as other possible issues.

SUMMARY

In one advantageous embodiment, a method for managing events in an electrical distribution system is provided. A number of events in the electrical distribution system is identified for an operator based on a profile for the operator. The wireless mobile device is assigned to the operator, and the profile includes a role of the operator. The number of events is sent to the wireless mobile device assigned to the operator.

In another advantageous embodiment, a method for managing events in an electrical distribution system is provided. The information about the electrical distribution system is received at a wireless mobile device assigned to an operator. The information received is based on a profile for the operator and a current position of the wireless mobile device with respect to the electrical distribution system. The profile includes a role of the operator. The information is displayed on the wireless mobile device.

In yet another advantageous embodiment, an apparatus for managing events in an electrical distribution system comprises a computer system. The computer system is configured to identify a number of events in the electrical distribution system for an operator based on a profile for the operator and a current position of a wireless mobile device with respect to the electrical distribution system. The wireless mobile device is assigned to the operator, and the profile includes a role of the operator. The computer system is configured to send the number of events to the wireless mobile device assigned to the operator.

In still yet another advantageous embodiment, a wireless mobile device comprises a display device, a wireless communications unit, and a processor unit connected to the display device and the wireless communications unit. The processor unit is configured to receive information about an electrical distribution system for an operator to whom the wireless mobile device is assigned. The information is based on a profile for the operator. The processor unit is configured to display the information on the wireless mobile device.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 14 is an illustration of a data processing system in accordance with an advantageous embodiment.

DETAILED DESCRIPTION

The different advantageous embodiments recognize and take into account a number of different considerations. As used herein, "a number of items" means one or more items. For example, a number of different considerations means one or more different considerations.

The different advantageous embodiments recognize and take into account that with currently-available electrical power systems, operators in the field in an electrical power system may not have all the information needed for performing operations for the electrical power system. For example, an operator may have a work order for a particular piece of equipment in the electrical power system. The different advantageous embodiments recognize and take into account that the operator may have a work order that does not contain the most up-to-date information about work that has been previously completed for a particular piece of equipment.

For example, the operator may not know that the work order has already been completed or partially completed by another operator. As one illustrative example, without knowledge that the work order has already been partially completed, the operator may perform unnecessary diagnostic operations in the area of the piece of equipment. Performing these operations may take more time than desired, may prolong power outages, and may reduce the amount of time that an operator has for completing other work orders. Further, the different advantageous embodiments recognize and take into account that without the most up-to-date information, an operator may be unable to perform work on the piece of equipment.

Thus, the different advantageous embodiments provide a method and apparatus for managing events in an electrical distribution system. In one advantageous embodiment, a number of events in the electrical distribution system is identified for an operator based on a profile for the operator. The wireless mobile device is assigned to the operator. The profile includes a role of the operator. The number of events is sent to the wireless mobile device assigned to the operator.

Figure 1:
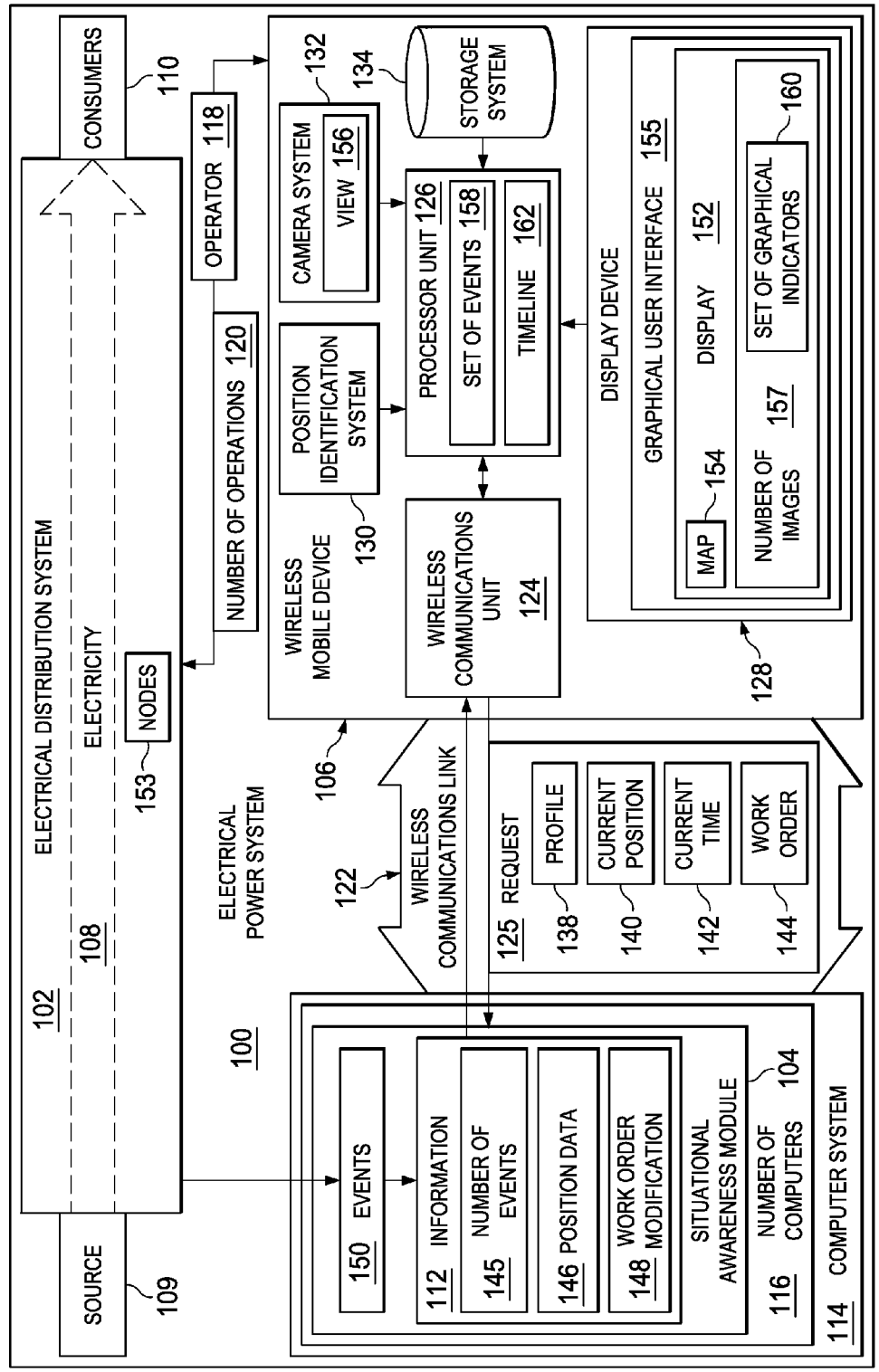
FIG. 1 is an illustration of an electrical power system in accordance with an advantageous embodiment.

With reference now to FIG. 1, an illustration of an electrical power system is depicted in accordance with an advantageous embodiment. In these illustrative examples, electrical power system 100 includes electrical distribution system 102, situational awareness module 104, and wireless mobile device 106.

As depicted, electrical distribution system 102 is configured to deliver electricity 108 from source 109 to consumers 110. In these illustrative examples, electricity 108 is also referred to as electrical energy.

Source 109 may be, for example, without limitation, a power plant comprising a number of power generators configured to generate electricity 108. Consumers 110 may include, for example, at least one of a residential consumer, a commercial consumer, an industrial consumer, a transportation consumer, a governmental consumer, and other suitable types of consumers.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Electrical distribution system 102 includes equipment that delivers electricity 108 from source 109 to consumers 110. For example, equipment in electrical distribution system 102 may include any number of transformers, cables, switches, control units, circuits, transmission lines, sockets, utility poles, and/or other suitable equipment configured for delivering electricity 108 to consumers 110. In some illustrative examples, electrical distribution system 102 may also include the power generators that generate electricity 108 and/or the consumer devices that consume electricity 108.

In these depicted examples, situational awareness module 104 is configured to process information for electrical distribution system 102. Situational awareness module 104 may be implemented using hardware, software, or a combination of the two.

As depicted, situational awareness module 104 may be a component within computer system 114 in these examples. Computer system 114 may take the form of number of computers 116. When more than one computer is present in number of computers 116, these computers may be in communication with each other over, for example, a network or other communications system. The network may include wires, cables, optical cables, wireless communications links, and other suitable types of media for transmitting information between computers in number of computers 116.

In these illustrative examples, situational awareness module 104 is configured to identify information 112 that may be used by operator 118. In particular, operator 118 may use information 112 to perform number of operations 120 for electrical distribution system 102.

Number of operations 120 may include, for example, at least one of repairing a utility pole in electrical distribution system 102, adjusting a transformer in electrical distribution system 102, collecting electricity meter readings from one of consumers 110, performing maintenance on a device in electrical distribution system 102, inspecting a structure in electrical distribution system 102, replacing a cable or switch in electrical distribution system 102, and other suitable types of operations.

As depicted, situational awareness module 104 sends information 112 to wireless mobile device 106 using wireless communications link 122. In these illustrative examples, wireless mobile device 106 is assigned to operator 118. Wireless mobile device 106 may take the form of, for example, without limitation, a cellular phone, a personal digital assistant (PDA), a tablet, a laptop, or some other suitable type of wireless mobile device capable of communicating with situational awareness module 104.

Wireless mobile device 106 includes, for example, wireless communications unit 124, processor unit 126, display device 128, position identification system 130, camera system 132, storage system 134, and/or other suitable components. Wireless communications unit 124 is configured to communicate with situational awareness module 104 using wireless communications link 122.

As one illustrative example, operator 118 may send request 125 for information 112 to situational awareness module 104. In this example, request 125 is generated using processor unit 126 in wireless mobile device 106 and sent to situational awareness module 104 using wireless communications unit 124 and wireless communications link 122.

In these illustrative examples, request 125 may include profile 138 for operator 118, current position 140 of wireless mobile device 106, current time 142, work order 144, and/or other suitable information. Profile 138 includes information about operator 118. For example, profile 138 may include information about operator 118 that may be used in generating information 112 to be sent to wireless mobile device 106.

Profile 138 may be created by operator 118 using wireless mobile device 106 and/or one or more of number of computers 116. Profile 138 may be stored in wireless mobile device 106 and/or computer system 114. Further, operator 118 may modify, delete, and/or replace profile 138 using wireless mobile device 106. For example, request 125 may include updates to profile 138 instead of including profile 138 in these illustrative examples.

Current position 140 of wireless mobile device 106 may be identified using position identification system 130 in wireless mobile device 106. Position identification system 130 may include, for example, a global positioning system unit, an inertial measurement unit, a number of tilt sensors, a compass, and/or some other suitable type of device.

Current position 140 may include at least one of a current geographic position, a heading, an orientation, and other suitable position information for wireless mobile device 106 with respect to electrical distribution system 102. The heading of wireless mobile device 106 may be identified using, for example, a compass in position identification system 130. The orientation of wireless mobile device 106 may be identified using, for example, a number of tilt sensors in position identification system 130. The number of tilt sensors may be configured to identify the tilt for wireless mobile device 106.

The current geographic position of wireless mobile device 106 may be in a three-dimensional coordinate system, a geographic coordinate system, a universal transverse Mercator (UTM) coordinate system, a military grid reference system (MGRS) coordinate system, and/or some other suitable type of coordinate system. As one illustrative example, the current geographic position of wireless mobile device 106 may be in latitude, longitude, and altitude.

Additionally, current time 142 may include a current date and/or time identified using position identification system 130 or some other suitable device in wireless mobile device 106. In these illustrative examples, work order 144 comprises information about one or more of number of operations 120 to be performed by operator 118. Further, number of operations 120 may be part of work order 144. For example, work order 144 may be a list of maintenance tasks to be performed on a number of utility poles within a particular area.

In these illustrative examples, situational awareness module 104 identifies information 112 using request 125 received from wireless mobile device 106. In particular, situational awareness module 104 identifies information 112 based on profile 138 for operator 118, current position 140 of wireless mobile device 106, current time 142, work order 144, and/or other suitable information in request 125.

As one illustrative example, information 112, identified using request 125, may include number of events 145, position data 146, work order modification 148, and/or other suitable information. Number of events 145 may include, for example, at least one of a service request, a trouble ticket, an undesired state for a piece of equipment, a generation of a work order to perform a maintenance operation, a detection of a parameter reaching a selected threshold, a completed task, an uncompleted task, an in-progress task, a stopped task, and other suitable events.

In these illustrative examples, an undesired state for a piece of equipment may occur when the piece of equipment is not operating within desired parameters. Further, an uncompleted task also may be referred to as a pending task.

As depicted, situational awareness module 104 may identify number of events 145 from events 150. Events 150 may include all events identified for electrical distribution system 102. At least a portion of events 150 may be received from nodes 153 in electrical distribution system 102.

Nodes 153 may include devices within electrical distribution system 102 and/or data processing systems associated with various pieces of equipment in electrical distribution system 102 and/or other suitable devices. Nodes 153 are configured to send information about events 150 to situational awareness module 104 as events 150 occur.

In these illustrative examples, situational awareness module 104 may identify the events in events 150 associated with current position 140 of wireless mobile device 106 and/or current time 142 as number of events 145. In this manner, situational awareness module 104 provides operator 118 with situational awareness for performing number of operations 120 for electrical distribution system 102.

Additionally, position data 146 includes information about current position 140 of wireless mobile device 106. Position data 146 may include, for example, a map for current position 140 and/or other suitable information about current position 140.

Further, work order modification 148 may include a modification that needs to be made to work order 144. As one illustrative example, work order modification 148 may indicate that work order 144 has already been completed by another operator. As another illustrative example, work order modification 148 may be a change to the scheduled date for performing number of operations 120. In some cases, work order modification 148 may be a change to number of operations 120 to be performed by operator 118.

In these illustrative examples, situational awareness module 104 sends information 112 identified using request 125 to wireless mobile device 106 using wireless communications link 122. Wireless communications unit 124 is configured to receive information 112 and send information 112 to processor unit 126. Processor unit 126 processes information 112 and generates display 152 for display in graphical user interface 155 on display device 128.

As depicted, display 152 may include map 154. Information 112 may be displayed on map 154. Map 154 may be, for example, a map for current position 140, a map of electrical distribution system 102, a satellite image, or some other suitable type of map.

In some illustrative examples, processor unit 126 may be configured to identify view 156 of camera system 132 in current position 140 of wireless mobile device 106. Processor unit 126 may identify set of events 158 from number of events 145 that have locations in view 156 of camera system 132 in current position 140 of wireless mobile device 106. As used herein, a set of items means one or more items. For example, a set of events is zero or more events. In this manner, a set may be a null or empty set.

Processor unit 126 displays number of images 157 from view 156 of camera system 132 on display device 128 with set of graphical indicators 160 for set of events 158 in locations in number of images 157 corresponding to the locations for set of events 158 in view 156 of camera system 132.

In these illustrative examples, number of images 157 may be displayed on display device 128 in substantially real-time. For example, number of images 157 may take the form of substantially real-time video. Further, the locations of set of graphical indicators 160 within number of images 157 may change as view 156 of camera system 132 changes. In this manner, display 152 may be an augmented reality display that is updated in substantially real-time.

Further, in some illustrative examples, processor unit 126 is configured to display number of events 145 according to timeline 162 for number of events 145. For example, display 152 on display device 128 may change over a period of time. In particular, the particular events in number of events 145 displayed on map 154 may be changed over time to present timeline 162 for number of events 145.

In these illustrative examples, information 112 displayed in display 152 on display device 128 may be adjusted as current position 140 of wireless mobile device 106 changes. For example, wireless mobile device 106 may be configured to continuously or periodically send current position 140 to situational awareness module 104. In response to a new position of wireless mobile device 106, new information identified with respect to the new position may be sent to wireless mobile device 106. In this manner, situational awareness module 104 may send information 112 to wireless mobile device 106 that is up-to-date.

In other illustrative examples, current position 140 may only be sent to situational awareness module 104 in response to a request for current position 140 received from situational awareness module 104. In this manner, processing resources, such as battery power, for wireless mobile device 106 may be reduced when current position 140 is not needed.

Additionally, in these illustrative examples, operator 118 may use graphical user interface 155 to send information to situational awareness module 104. For example, operator 118 may enter a date and/or time for the completion of work order 144 and/or other information about work order 144 using graphical user interface 155. This information may then be sent to situational awareness module 104.

In some illustrative examples, operator 118 may make modifications to profile 138 for operator 118 using graphical user interface 155. These modifications may then be sent to situational awareness module 104 to update profile 138 for operator 118 stored in computer system 114.

In other illustrative examples, images generated by camera system 132 may be sent to situational awareness module 104. For example, operator 118 may use camera system 132 to generate images of a component in electrical distribution system 102 that needs to be replaced. These images may be sent to situational awareness module 104 and stored in computer system 114. In some cases, these images may be used to generate a new work order for replacing the component.

Additionally, in some illustrative examples, wireless mobile device 106 may have other sensors configured to generate information that may be sent to situational awareness module 104. For example, without limitation, information may be generated by a temperature sensor, a radar system, an infrared imaging system, a voltmeter, a digital multimeter, and/or other suitable types of sensors.

The illustration of electrical power system 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, operator 118 may perform number of operations 120 for other electrical systems within electrical power system 100. For example, number of operations 120 may be performed for an electrical generation system, a transmission system, and/or some other suitable type of electrical system within electrical power system 100.

In some illustrative examples, more than one wireless mobile device may be in communication with situational awareness module 104. For example, operators in addition to operator 118 may have wireless mobile devices assigned to them. These operators may perform different operations at different locations within electrical distribution system 102 using information 112 provided by situational awareness module 104.

In still other illustrative examples, situational awareness module 104 may be configured to send information 112 to wireless mobile device 106 in response to an event instead of request 125. For example, situational awareness module 104 may send information 112 to wireless mobile device 106 in response to an indication that wireless mobile device 106 has reached a certain position with respect to electrical distribution system 102. Additionally, in some cases, wireless mobile device 106 may be part of computer system 114 and in communication with number of computers 116.

Further, in some illustrative examples, situational awareness module 104 may be configured to generate work order 144 and send work order 144 to wireless mobile device 106. Additionally, situational awareness module 104 may send information 112 needed for performing operations identified in work order 144 with work order 144 to wireless mobile device 106.

In other illustrative examples, one or more of profile 138, current position 140, current time 142, and work order 144 may not be present in request 125 for information 112. Still further, in some cases, request 125 may include information in addition to the information described above in request 125. For example, request 125 may include information about wireless mobile device 106, equipment used by operator 118 to perform number of operations 120, equipment that has been installed, repaired, and/or replaced, and/or other suitable types of information.

Figure 2:
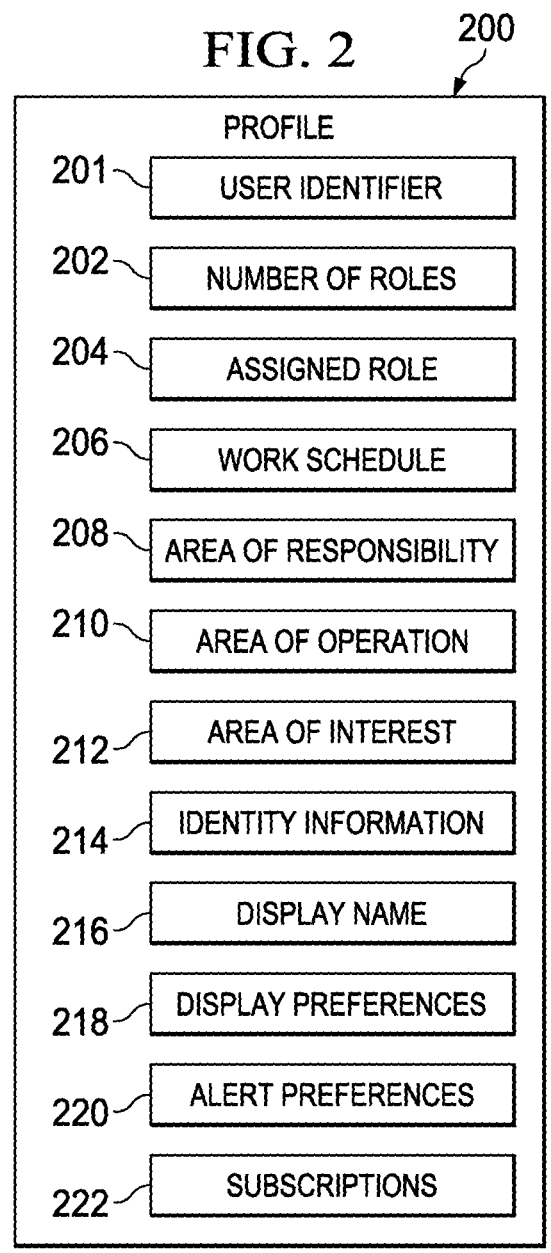
FIG. 2 is an illustration of a profile in accordance with an advantageous embodiment.

With reference now to FIG. 2, an illustration of a profile is depicted in accordance with an advantageous embodiment. In this illustrative example, profile 200 is an example of one implementation for profile 138 in FIG. 1. Profile 200 may be stored on at least one of computer system 114 and wireless mobile device 106 in FIG. 1.

As depicted, profile 200 may include user identifier 201, number of roles 202, assigned role 204, work schedule 206, area of responsibility 208, area of operation 210, area of interest 212, identity information 214, display name 216, display preferences 218, alert preferences 220, and subscriptions 222 for an operator, such as operator 118 in FIG. 1. User identifier 201 may be an identification number for the operator.

Number of roles 202 may include at least one of an inspector, a tester, a mechanic, an engineer, a manager, a technician, a consultant, or some other suitable type of role. In some cases, an operator may have more than one role. When profile 200 is sent in request 125 in FIG. 1, assigned role 204 is the particular role in number of roles 202 under which operations are to be performed by the operator.

Work schedule 206 provides information about the number of work orders to be completed by the operator, the number of operations to be performed by the operator, the work completed by the operator, the work scheduled for the operator, and/or other suitable information. Area of responsibility 208 includes the various areas for which the operator is responsible. For example, area of responsibility 208 may be a geographic region, a city, a neighborhood, a town, a block, or some other suitable type of area.

Area of operation 210 includes the area in which the operator is currently performing operations or needs to perform operations. In this illustrative example, area of interest 212 includes the area for which the request for information is being sent. As one illustrative example, area of interest 212 may be a portion of area of operation 210. In some cases, area of interest 212 may include some or all of area of responsibility 208 and/or area of operation 210, as well as other areas. For example, area of interest 212 may be a service area outside of area of responsibility 208 when the operator is temporarily assigned to support operations being performed out of state.

Further, identity information 214 includes information that can be used to identify the operator. Identity information 214 may include, for example, a photograph of the operator, an employee identification number, a password, biometric information, and/or other suitable information. Biometric information for the operator may include, for example, without limitation, fingerprints, a facial profile, a retinal scan, and/or other suitable information.

Display name 216 is the name of the operator as the name is to be displayed on display device 128 for wireless mobile device 106 in FIG. 1. Display preferences 218 include the preferences of the operator for how display 152 is to be generated on display device 128 in FIG. 1. For example, display preferences 218 may include notification preferences, time constraints for the display, geographic constraints for the display, the type of information to be displayed, and/or other suitable types of preferences.

As one illustrative example, a time constraint in display preferences 218 may indicate that only information relevant to a particular period of time is to be displayed. As another illustrative example, a geographic constraint in display preferences 218 may indicate that only information relevant to a particular geographic region is to be displayed.

Further, display preferences 218 may include a number of adjustments for a vernier scale for a timeline, units for the adjustments for the vernier scale, and/or other preferences for the vernier scale for the display. A vernier scale is a secondary scale for the timeline. The vernier scale may be synchronized with a primary time scale.

For example, the primary time scale may be in months. The vernier scale may be in days and may allow information for days within a particular month to be viewed. Other units for the vernier scale may include, for example, without limitation, minutes, hours, weeks, and/or some other unit of time.

Alert preferences 220 include preferences for alerts received from situational awareness module 104 in FIG. 1. These preferences may include how alerts are to be displayed, when alerts are to be displayed, when alerts are not to be displayed, when alerts are to be removed from display, and/or other suitable types of preferences.

For example, alert preferences 220 may indicate that only alerts relevant to a particular area of interest are to be displayed. Further, alert preferences 220 may indicate that a certain type of alert is displayed as a flashing alert, while another type of alert is displayed in a particular color.

Subscriptions 222 identify the notifications to which the operator has subscribed. For example, the operator may subscribe to receive notifications about the completions of work orders at a wireless mobile device. Subscriptions 222 may identify how often these notifications are to be received at the wireless mobile device. As one illustrative example, subscriptions 222 may indicate that notifications about the completion of work orders are to be received every four hours. Of course, the operator may subscribe to receive other types of information at the wireless mobile device.

The illustration of profile 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, profile 200 may include additional information about an operator in addition to the information described above. For example, profile 200 may include a level of experience for the operator. In other illustrative examples, profile 200 may not include identity information 214, display name 216, and/or number of roles 202.

Figure 3:
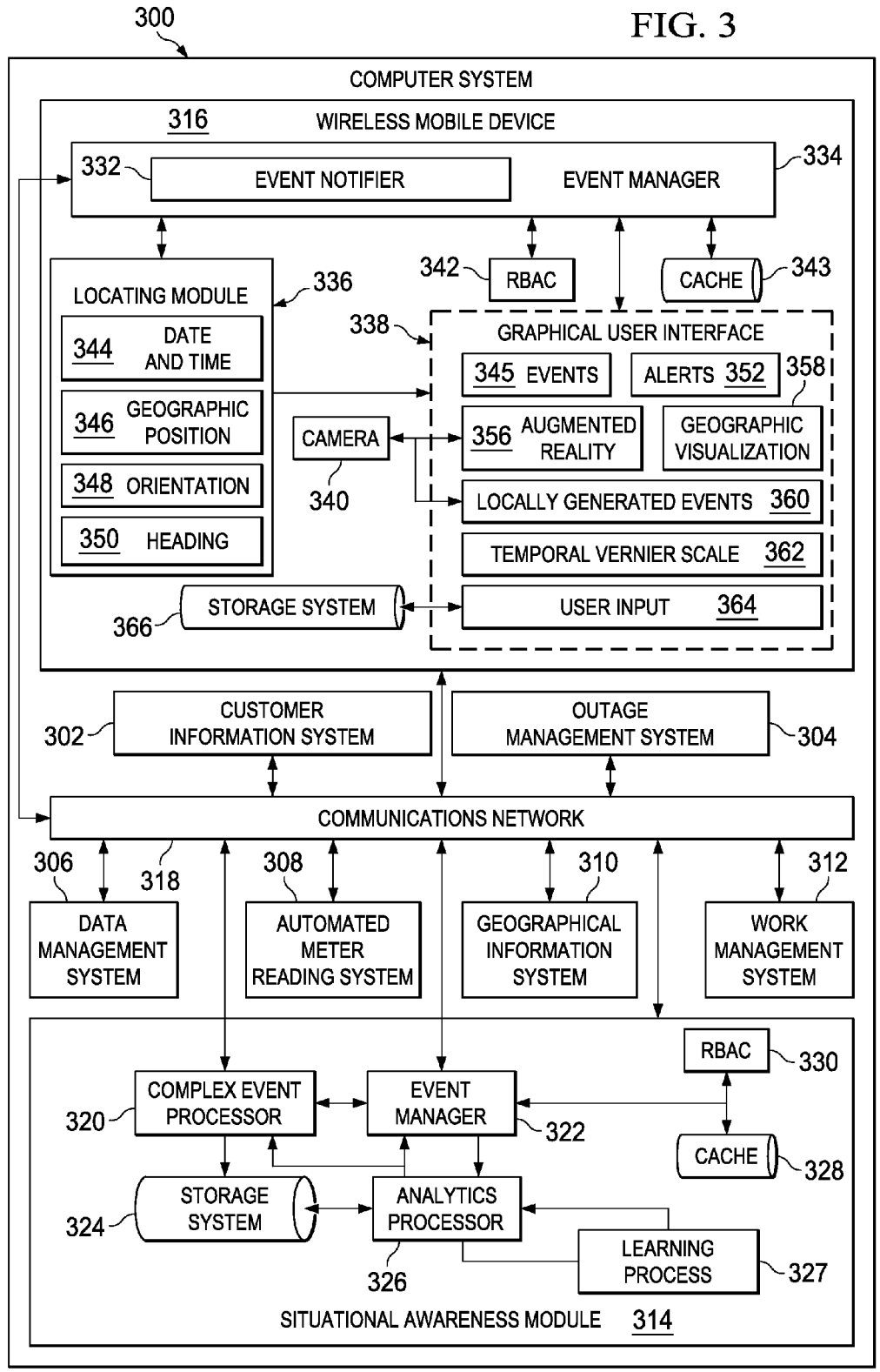
FIG. 3 is an illustration of a computer system in an electrical power system in accordance with an advantageous embodiment.

With reference now to FIG. 3, an illustration of a computer system in an electrical power system is depicted in accordance with an advantageous embodiment. In this illustrative example, computer system 300 is an example of one implementation for computer system 114 in electrical power system 100 in FIG. 1.

As depicted, computer system 300 includes customer information system (CIS) 302, outage management system (OMS) 304, data management system (DMS) 306, automated meter reading (AMR) system 308, geographical information system (GIS) 310, work management system (WMS) 312, situational awareness module 314, and wireless mobile device 316.

These different systems implemented within computer system 300 are in communication with each over communications network 318. Communications network 318 may include any number of wired communications links, wireless communications links, optical communications links, and/or other suitable communications links.

Customer information system 302 provides customer service and billing services. For example, customer information system 302 provides services related to electricity connections, electricity disconnections, billing inquiries, work order statuses, planned power outage notifications, media communications, and/or other services. Further, customer information system 302 is also configured to generate service requests and/or trouble tickets. For example, a service request may be generated in response to receiving a customer report indicating that an outage has occurred in the electrical power system.

Outage management system 304 is configured to record information about any outages that occur within an electrical power system. Information from outages may be received from a number of sources, such as, for example, without limitation, Supervisory Control and Data Acquisition (SCADA) equipment, metering systems, customer outage reports, and/or other suitable sources.

Additionally, in this illustrative example, outage management system 304 performs analysis of outages in the electrical power system using data obtained from, for example, electrical power meters, intelligent electrical devices, a meter data management system, sensors in the electrical power system, and/or other sources. Outage management system 304 sends data resulting from the analysis of the outages to data management system 306. Further, outage management system 304 may be configured to send requests for the generation of a work order.

Data management system 306 is configured to store the data received from outage management system 304 and/or other suitable information. For example, data management system 306 may store system configurations, meter readings, service level data, and/or other information about outages that occur within the electrical power system.

In these illustrative examples, automated meter reading system 308 is configured to provide meter readings from various locations within the electrical power system. Geographical information system 310 is configured to provide information about events with respect to the geographical locations within the electrical power system at which the events occur.

For example, geographical information system 310 may provide information, such as, without limitation, current, historical, and predicted weather information, electrical power system information, asset and equipment information, and/or other suitable information. Weather information may include, for example, temperature, precipitation, wind, lightning events, and/or other suitable weather information.

Electrical power system information may include, for example, switch states, electrical characteristics of the electrical power system, and/or other suitable information. Asset and equipment information may include an identification of spare utility poles, spare transformers, and/or other parts that may be used in performing maintenance for the electrical power system.

Further, geographical information system 310 may also provide information about the physical topology of the components in the electrical power system, the physical topology of utility infrastructure near the electrical power system, and/ or other geographically registered information. Utility infrastructure may include, for example, gas pipes, sewer pipes, water pipes, and/or other suitable components.

Work management system 312 is configured to manage work performed for the electrical power system. For example, work management system 312 may keep track of equipment maintenance and repair schedules, asset stores, scheduling requirements, parts, repair equipment, human resource schedules, uncompleted tasks, completed tasks, scheduled tasks, tasks that need to be scheduled, and/or late tasks.

In this illustrative example, situational awareness module 314 is an example of one implementation for situational awareness module 104 in FIG. 1. As depicted, situational awareness module 314 includes complex event processor 320, event manager 322, storage system 324, analytics processor 326, learning process 327, cache 328, and role-based access control (RBAC) 330.

Complex event processor 320 is configured to receive information from the various systems in computer system 300 over communications network 318. In particular, complex event processor 320 may receive information from customer information system 302, outage management system 304, data management system 306, automated meter reading system 308, geographical information system 310, and/or work management system 312.

In this illustrative example, the information received by complex event processor 320 may be received in substantially real-time as the information is generated by the different systems in computer system 300. Complex event processor 320 processes the information received from the different systems in computer system 300 to identify, generate, modify, and/or otherwise process events.

In particular, complex event processor 320 may use at least one of a policy, a number of rules, a number of criteria, and/or other factors to process the information. For example, complex event processor 320 may use a number of criteria for generating an event, such as a work order, to process the information.

As one illustrative example, complex event processor 320 may receive and process meter readings from automated meter reading system 308 and outage reports from outage management system 304. Complex event processor 320 uses these meter readings and outage reports along with information generated by geographical information system 310 and work management system 312 to generate a work order.

Further, complex event processor 320 stores at least a portion of the information received from the different systems in computer system 300 in storage system 324. The policy, number of rules, number of criteria, and/or other factors used by complex event processor 320 to process the information may be stored in storage system 324. In some illustrative examples, storage system 324 may take the form of a nonrelational structured query language (NoSQL) persistent storage system.

Events generated by complex event processor 320 are sent to event manager 322. Event manager 322 is configured to process these events and send alerts to wireless mobile device 316. These alerts may be sent based on a profile.

For example, an operator using wireless mobile device 316 may send authentication information to situational awareness module 314. This authentication information may be in the form of, for example, a user name and password and/or a profile for the operator.

This authentication information is received by event manager 322 and processed using role-based access control 330 to allow wireless mobile device 316 access to situational awareness module 314 and situational awareness module 314 access to wireless mobile device 316. Further, the authentication information may be stored in cache 328.

Event manager 322 is configured to generate and send alerts to wireless mobile device 316 based on the authentication information of the operator. Further, event manager 322 is configured to receive information from wireless mobile device 316. This information may be sent to complex event processor 320 and/or analytics processor 326.

For example, a profile for an operator received by event manager 322 may be sent to complex event processor 320. Complex event processor 320 may use the profile of the operator along with a number of geographic and/or temporal constraints to generate an event.

In this illustrative example, analytics processor 326 is configured to analyze the information stored in storage system 324 and/or the information received from event manager 322 to perform diagnostic operations. These diagnostic operations may include modifying rules and/or criteria used to generate events, predicting maintenance operations to be performed, determining optimal power flow, recommending service operations, and/or other types of diagnostic operations.

Learning process 327 is used with analytics processor 326 to update the analysis methods used by analytics processor 326 based on the historical performance of analytics processor 326. For example, learning process 327 may use positive-negative reinforcement to update the methods used by analytics processor 326. In this manner, the performance of diagnostic operations by analytics processor 326 may be improved.

In this depicted example, wireless mobile device 316 includes event manager 334, locating module 336, graphical user interface 338, camera 340, role-based access control (RBAC) 342, and cache 343. Role-based access control 342 provides an operator access to wireless mobile device 316 using authentication information for the operator.

This authentication information may include, for example, a profile for the operator, a user name, a password, log in information, a certificate of credentials, biometric data, and/or other suitable information. This authentication information may be locally stored in cache 343. Further, this authentication information may be provided to situational awareness module 314 through event manager 334.

Event manager 334 is configured to send information to and receive information from situational awareness module 314. As depicted, event manager 334 includes event notifier 332. Event notifier 332 is configured to receive events 345 sent from situational awareness module 314 over communications network 318. In particular, event notifier 332 notifies event manager 334 that events 345 have been received. Event manager 334 processes events 345 using locating module 336.

In this illustrative example, locating module 336 is configured to generate date and time 344, geographic position 346, orientation 348, and heading 350. Date and time 344 may include, for example, a current date and/or current time. Geographic position 346 is a current position of wireless mobile device 316 in three-dimensional geographic coordinates. Orientation 348 indicates an orientation or amount of tilt for wireless mobile device 316. Heading 350 may be identified using a magnetic compass and may indicate a direction selected from north, east, south, and west.

Event manager 334 generates a display on graphical user interface 338 that includes events 345 and any of alerts 352 received. In some cases, the display on graphical user interface 338 may take the form of augmented reality 356 or geographic visualization 358.

Augmented reality 356 may be generated using images generated by camera 340. Events 345 and/or alerts 352 may be displayed on the images generated by camera 340 in substantially real-time. With geographic visualization 358, events 345 and/or alerts 352 may be displayed on a map, a satellite image, or some other representation of a geographical area for geographic position 346.

Further, in some cases, event manager 334 may display locally generated events 360 on graphical user interface 338. Locally generated events 360 may be events generated by event manager 334. Locally generated events 360 may include, for example, an installation of a replacement utility pole, a reset of a breaker, a completion of work on a transformer, and/or other suitable events.

In this illustrative example, temporal vernier scale 362 allows an additional level of control for viewing information on graphical user interface 338 with respect to time. The number of adjustments and/or the units for temporal vernier scale 362 may be selected based on the display preferences for the operator using wireless mobile device 316.

In some illustrative examples, the operator may enter user input 364 through a number of user input devices configured to interact with graphical user interface 338. User input 364 may include, for example, display preferences for the operator, information for a profile for the operator, and/or other suitable information. This information may be stored in storage system 366. Storage system 366 may be, for example, a local cache stored in wireless mobile device 316.

Figure 4:
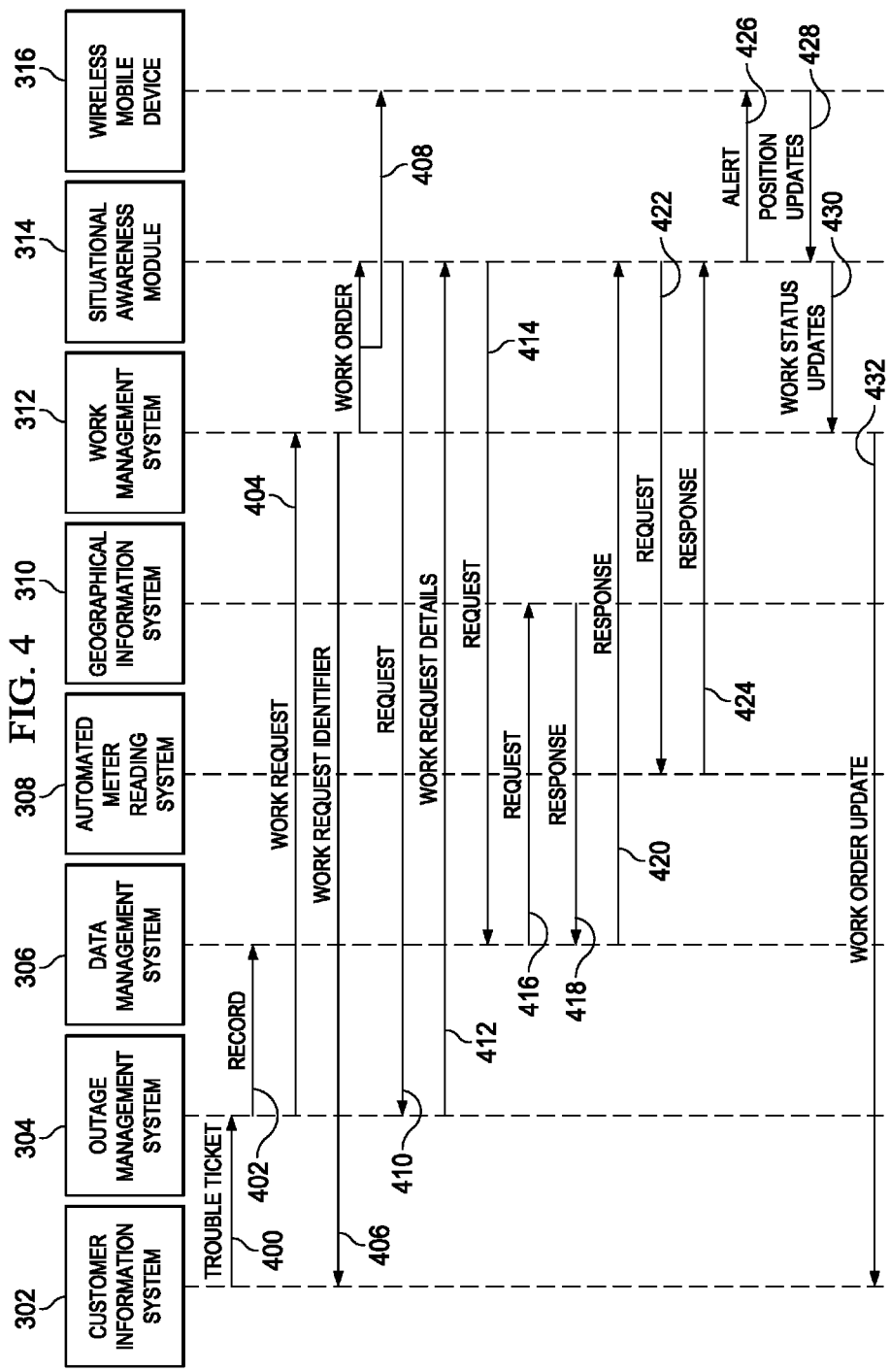
FIG. 4 is an illustration of a flow of information within a computer system in accordance with an advantageous embodiment.

With reference now to FIG. 4, an illustration of a flow of information within a computer system is depicted in accordance with an advantageous embodiment. In this illustrative example, the flow of information is an example of one implementation for the flow of information between the different components in computer system 300 in FIG. 3. Customer information system 302, outage management system 304, data management system 306, automated meter reading system 308, geographical information system 310, work management system 312, situational awareness module 314, and wireless mobile device 316 over communications network 318 from FIG. 3 is depicted.

In this illustrative example, customer information system 302 generates trouble ticket 400 and sends trouble ticket 400 to outage management system 304. Trouble ticket 400 indicates that an outage of electrical power has occurred in a particular area.

Outage management system 304 generates record 402 for this outage and sends record 402 to data management system 306. Record 402 includes information about the outage. This information may include, for example, a length of time for the outage, a start time for the outage, a number of consumers without electricity, a number of square kilometers without electricity, and/or other suitable information. Data management system 306 stores record 402.

Additionally, outage management system 304 generates work request 404 and sends work request 404 to work management system 312. Work request 404 is a request for the generation of a work order. Work management system 312 sends work request identifier 406 to customer information system 302. Work request identifier 406 is an identifier used to track the status of work request 404 using customer information system 302.

Work management system 312 generates work order 408 and sends work order 408 to situational awareness module 314. Further, work management system 312 also sends work order 408 to wireless mobile device 316.

In this illustrative example, situational awareness module 314 generates request 410 for work order details and sends request 410 to outage management system 304. In response to receiving request 410, outage management system 304 sends work request details 412 to situational awareness module 314.

Situational awareness module 314 then generates request 414 and sends request 414 to data management system 306. Request 414 is for information about a number of events that has occurred within a certain period of time prior to a current time and/or within the area in which the outage is present. Data management system 306 sends request 416 to geographical information system 310 for information about the number of events with respect to the area in which the outage is present. Geographical information system 310 sends response 418 providing the requested information to data management system 306.

Further, data management system 306 then sends the requested information about the number of events in response 420 to situational awareness module 314. Situational awareness module 314 sends request 422 for meter data to automated meter reading system 308. Automated meter reading system 308 is configured to send response 424 comprising any relevant meter data to situational awareness module 314.

In this illustrative example, situational awareness module 314 sends alert 426 to wireless mobile device 316. Alert 426 includes information about the number of events that have been processed using any relevant meter data identified.

Wireless mobile device 316 may display the information included in alert 426 for viewing by the operator. The operator may use the information to perform a number of operations identified in work order 408. Wireless mobile device 316 sends position updates 428 to situational awareness module 314 over time.

In this illustrative example, situational awareness module 314 sends work status updates 430 to work management system 312 using position updates 428. Work status updates 430 include, for example, without limitation, updates about work that has been initiated, work that is in progress, work that has been completed, and/or other updates regarding the status of the work requested in work request 404.

Work management system 312 uses work status updates 430 to adjust the scheduling of human resources, equipment, assets, and/or other resources needed for performing the work requested in work request 404. For example, work management system 312 may adjust which personnel are assigned to perform the operations for the work based on deviations from the current plan for performing the work.

Thereafter, work management system 312 sends work order update 432 to customer information system 302. Work order update 432 includes an identification of the status of work order 408, details about the status of work order 408, information about current and/or potential delays, expected completion times, and/or other suitable information.

The illustrations of computer system 300 in FIG. 3 and the flow of information between components in computer system 300 in FIG. 4 are not meant to imply limitations to the manner in which an advantageous embodiment may be implemented. For example, in some illustrative examples, computer system 300 may not include geographical information system 310. Instead, geographical information system 310 may be part of data management system 306.

With reference now to FIGS. 5-9, illustrations of different displays on a graphical user interface for a wireless mobile device are depicted in accordance with an advantageous embodiment. The different displays illustrated are for viewing by an operator, such as operator 118 in FIG. 1.

Figure 5:
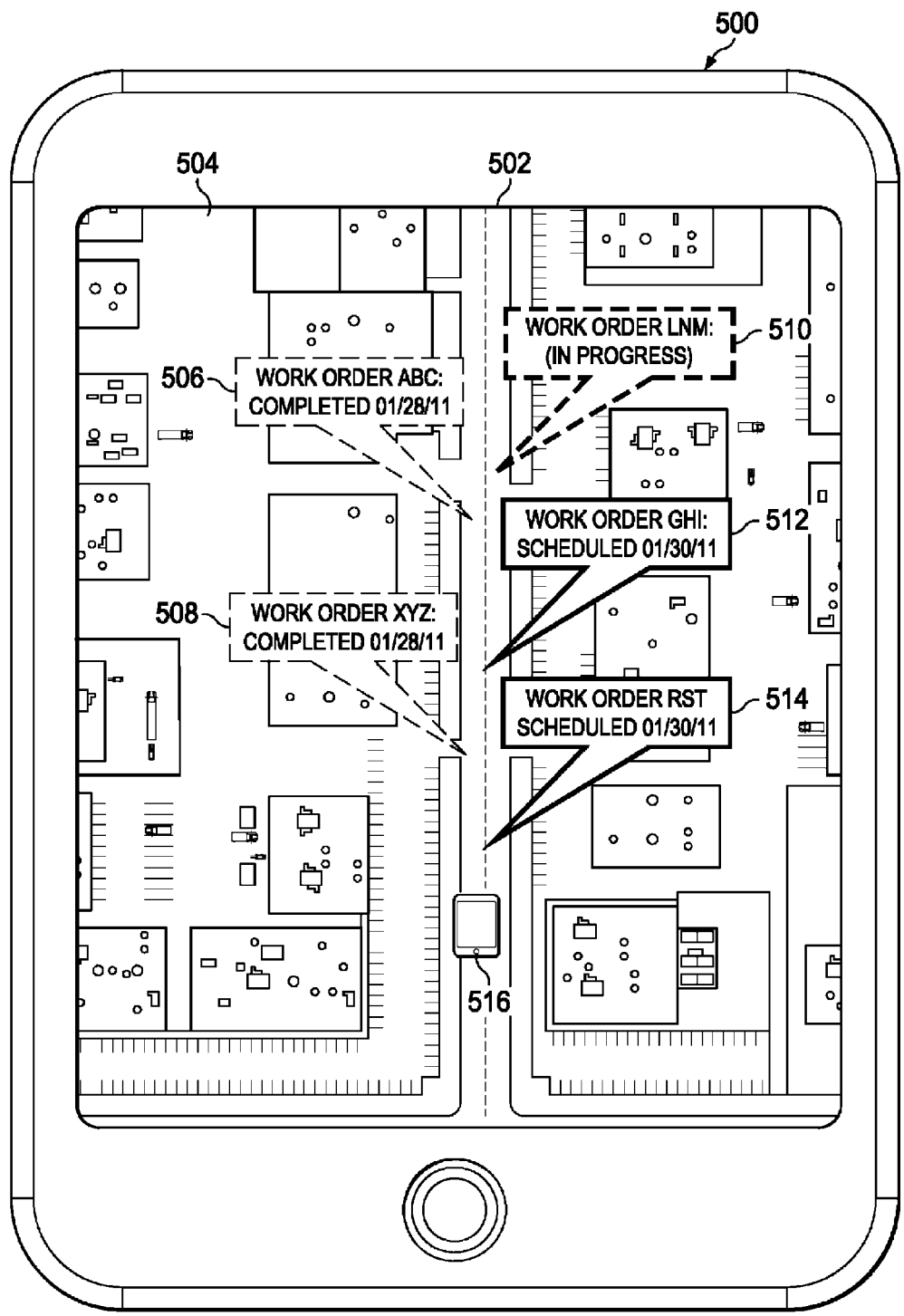
FIG. 5 is an illustration of a display on a graphical user interface for a wireless mobile device in accordance with an advantageous embodiment.

Turning first to FIG. 5, wireless mobile device 500 is an example of one implementation for wireless mobile device 106 in FIG. 1. As depicted, graphical user interface 502 is displayed on wireless mobile device 500. In particular, map 504 is displayed on graphical user interface 502.

As depicted, graphical indicators 506, 508, 510, 512, and 514 are displayed on map 504. These graphical indicators represent work orders. Graphical indicators 506, 508, 510, 512, and 514 are displayed in locations on map 504 that correspond to locations in an electrical power system at which these work orders were completed or are to be completed.

In this illustrative example, graphical indicator 506 and graphical indicator 508 represent completed work orders. Further, graphical indicator 510 represents a work order that is currently being performed. Graphical indicator 512 and graphical indicator 514 are work orders that have been scheduled for a future time. As depicted, each of the graphical indicators displayed has a pattern that represents a time for the corresponding work order according to a timeline for the work orders.

Additionally, icon 516 is displayed on map 504. Icon 516 represents a wireless mobile device. Icon 516 is displayed in a location on map 504 that corresponds to a current position of the wireless mobile device.

Figure 6:
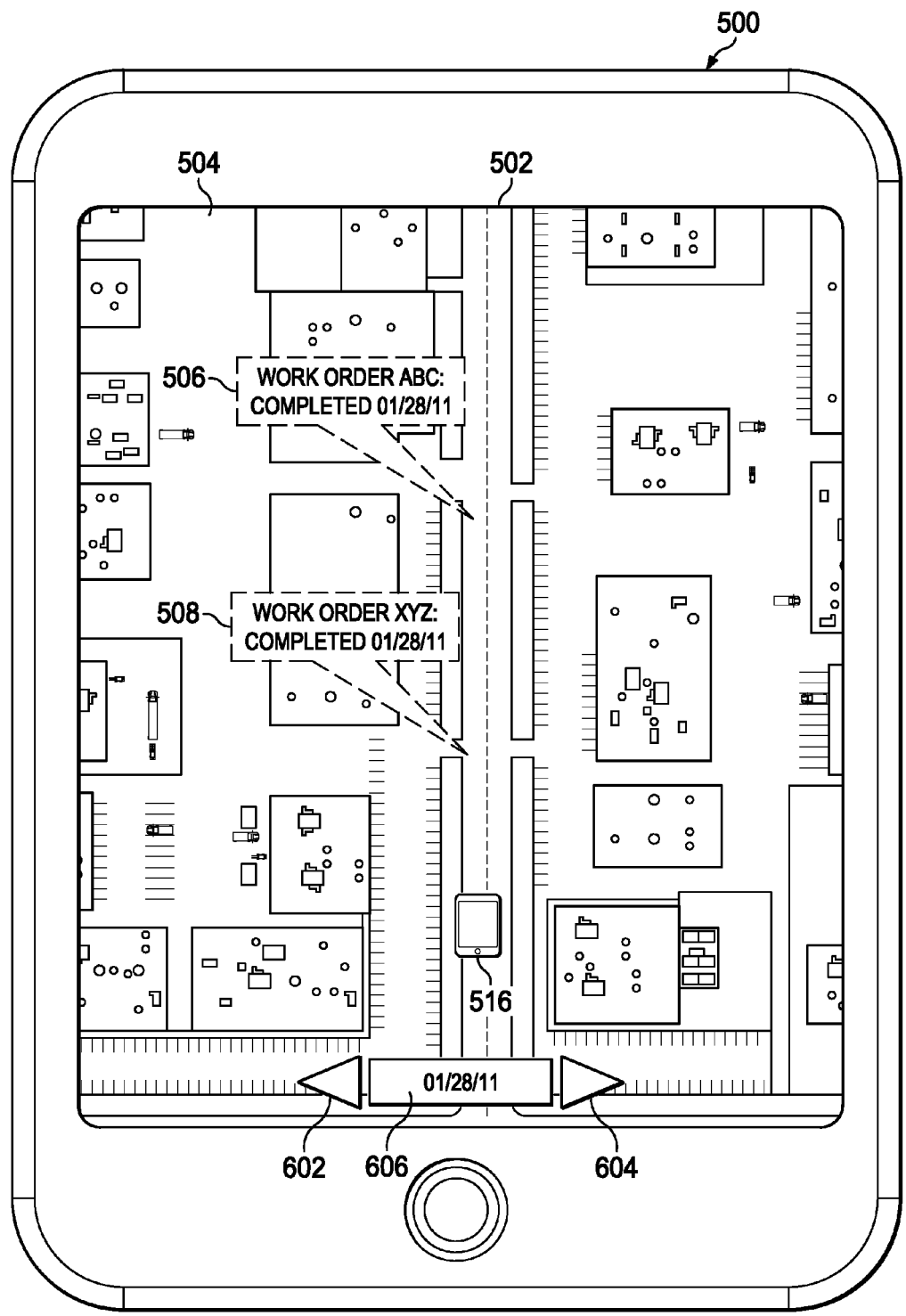
FIG. 6 is an illustration of a display on a graphical user interface for a wireless mobile device in accordance with an advantageous embodiment.

With reference now to FIG. 6, only a portion of graphical indicators 506, 508, 510, 512, and 514 displayed on map 504 in FIG. 5 are displayed in this illustrative example. As depicted, an operator may use control 602 and control 604 to select date 606. Date 606 is the date for which graphical indicators representing work orders and/or other suitable events are displayed in graphical user interface 502.

Control 602 allows an earlier date before date 606 to be selected, while control 604 allows a later date after date 606 to be selected. When date 606 is selected, graphical indicator 506 and graphical indicator 508 are displayed. These graphical indicators represent work orders that were completed on date 606.

Figure 7:
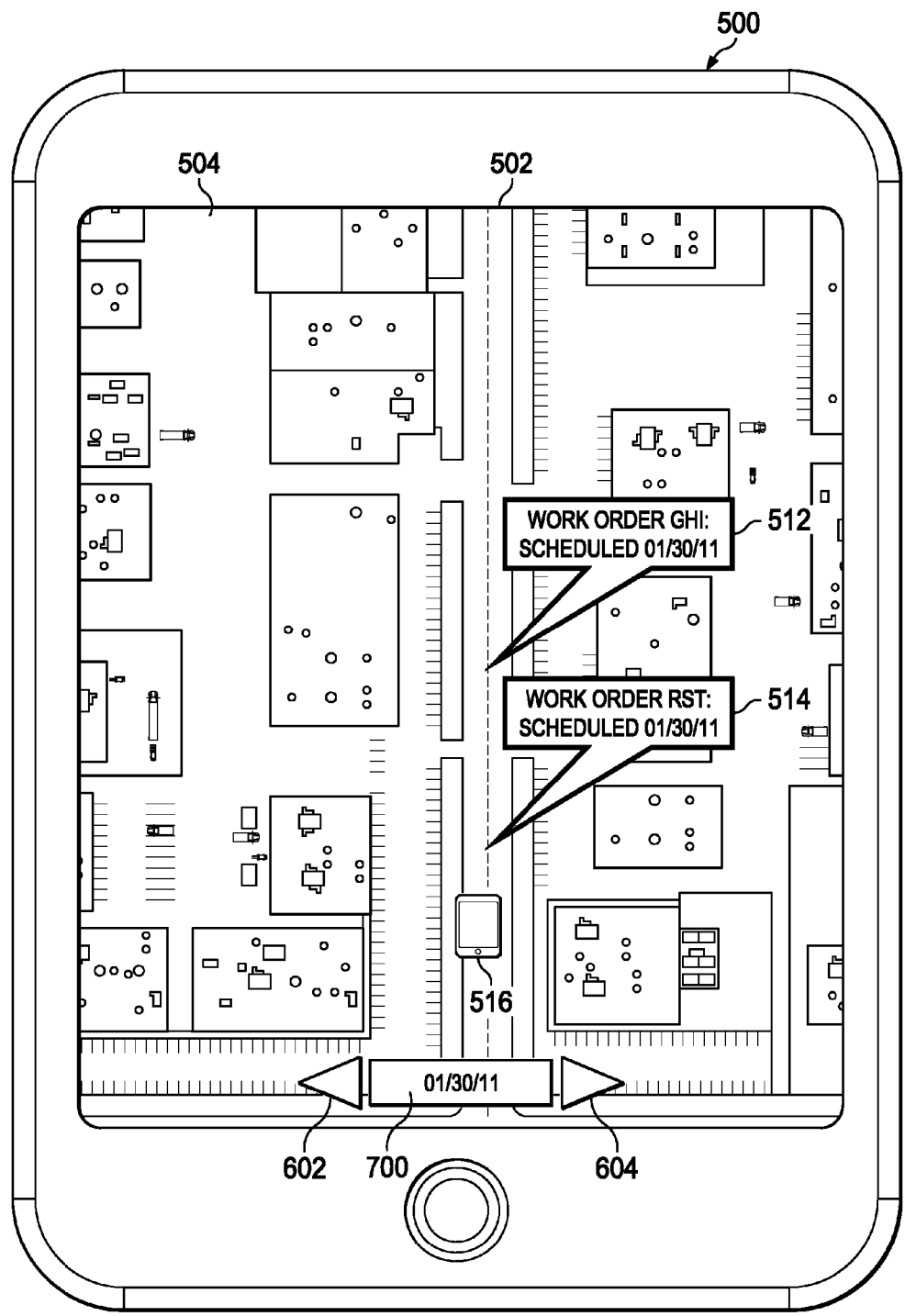
FIG. 7 is an illustration of a display on a graphical user interface for a wireless mobile device in accordance with an advantageous embodiment.

In FIG. 7, a different date from date 606 in FIG. 6 has been selected using control 604. As depicted, date 700 has been selected. When date 700 is selected, graphical indicator 512 and graphical indicator 514 are displayed on map 504. These graphical indicators represent work orders that are scheduled for date 700.

Figure 8:
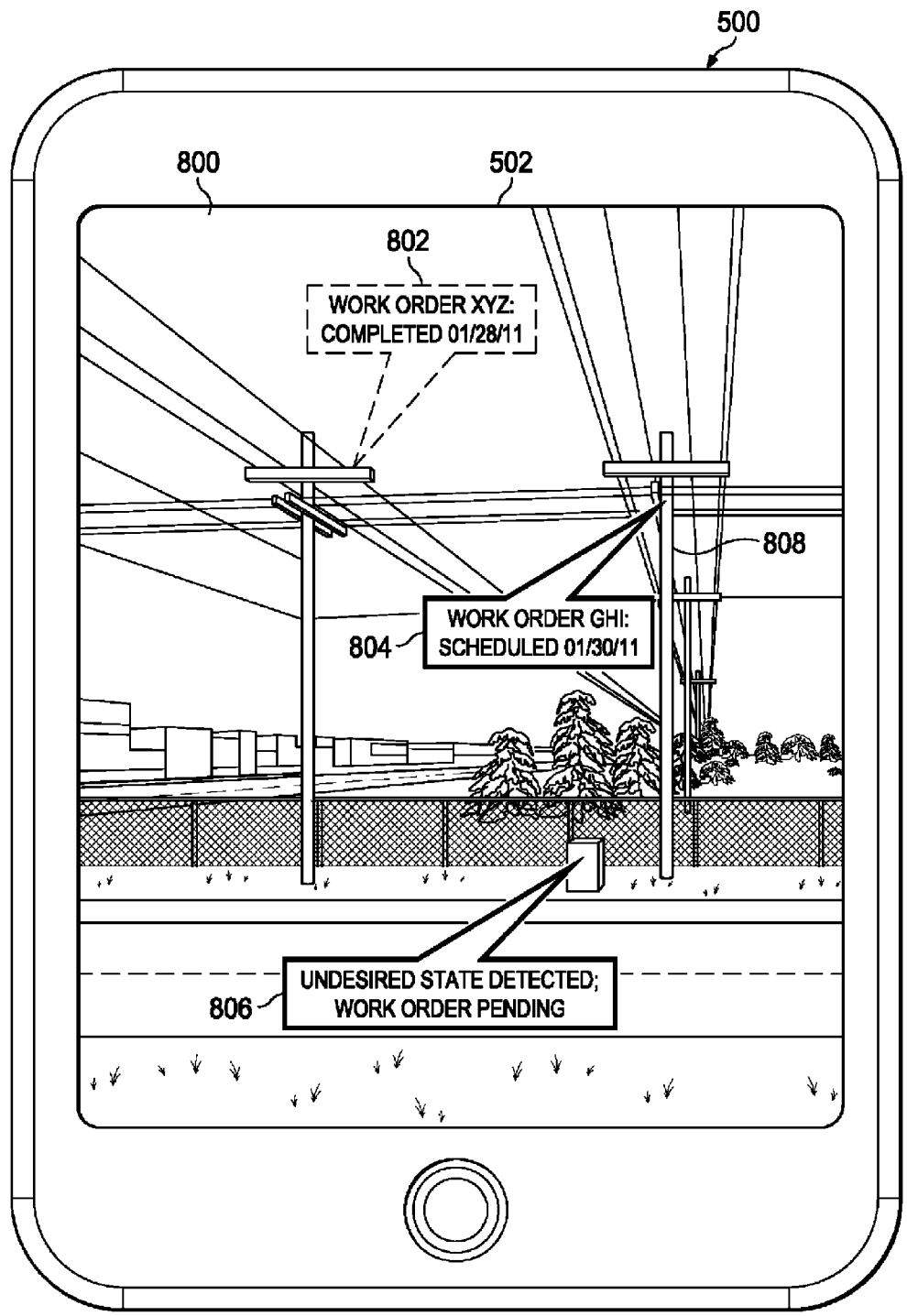
FIG. 8 is an illustration of a display on a graphical user interface for a wireless mobile device in accordance with an advantageous embodiment.

With reference now to FIG. 8, image 800 is displayed on graphical user interface 502. Image 800 is an image generated by a camera system, such as camera system 132 in FIG. 1. Image 800 is displayed on graphical user interface 502 in substantially real-time.

As illustrated, graphical indicators 802, 804, and 806 are displayed on image 800. These graphical indicators represent events. In particular, graphical indictor 802 and graphical indicator 804 represent work orders, while graphical indicator 806 represents the detection of an undesired state for a piece of equipment.

In this illustrative example, graphical indicators 802, 804, and 806 are displayed in locations on image 800 that correspond to locations for the corresponding events in a view of the camera system. For example, pole 808 in image 800 may be in the view of the camera system. Graphical indicator 804 is displayed in a location on image 800 relative to pole 808 to indicate that a work order has been scheduled for pole 808.

The image displayed on graphical user interface 502 may change as the view of the camera system changes. Further, the graphical indicators displayed on the image displayed on graphical user interface 502 may also change. These changes may be made in substantially real-time to provide an augmented reality display to the operator.

Figure 9:
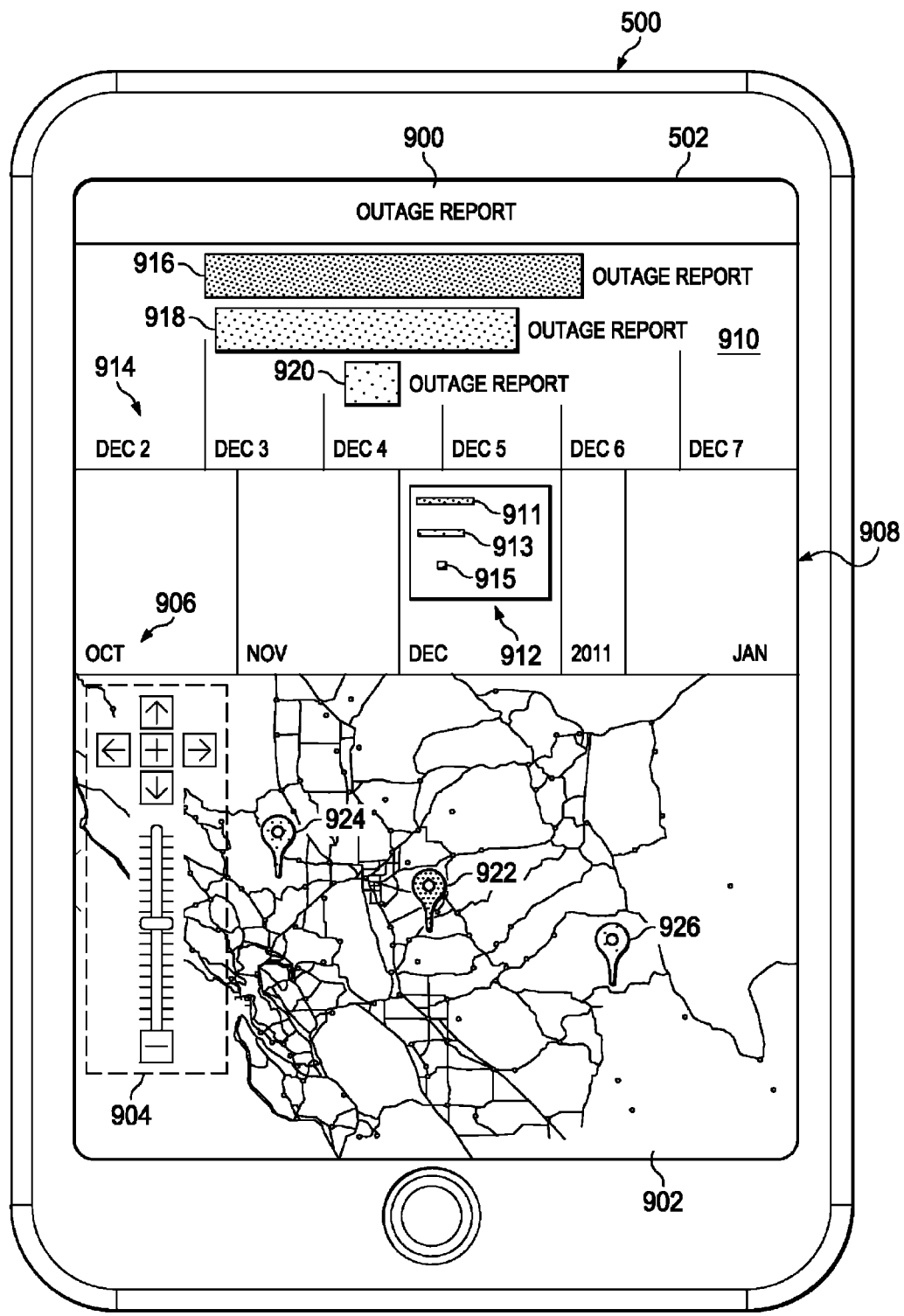
FIG. 9 is an illustration of a display on a graphical user interface for a wireless mobile device in accordance with an advantageous embodiment.

With reference now to FIG. 9, display 900 in graphical user interface 502 includes map 902. Map controls 904 provide zooming in and zooming out features for map 902. Display 900 also includes timeline 906. Timeline 906 is displayed using primary time scale 908 and secondary time scale 910. Secondary time scale 910 is a vernier time scale for primary time scale 908. For example, primary time scale 908 is in months. Secondary time scale 910 is in days.

Further, an operator may interact with graphical user interface 502 to control display 900 using touch. For example, a tactile selection of a particular month for primary time scale 908 causes at least a portion of the days for that particular month to be displayed in display 900. Additionally, any events for those days are also displayed.

For example, graphical indicators 911, 913 and 915 are displayed in month 912 in primary time scale 908. These graphical indicators represent events. These events are outage reports in this illustrative example. When month 912 is selected, days 914 are displayed. Graphical indicators 916, 918, and 920 are displayed for days 914. Graphical indicators 916, 918, and 920 correspond to graphical indicators 911, 913, and 915, respectively, in this depicted example. In other words, graphical indicators 916, 918, and 920 and graphical indicators 911, 913, and 915, respectively, represent the same events.

Further, as depicted, the locations for these events are identified on map 902 by graphical indicators 922, 924, and 926. Graphical indicators 922, 924, and 926 correspond to graphical indicators 911, 913, and 915 and graphical indicators 916, 918, and 920, respectively. In this manner, graphical indicators 911, 916 and 922 represent the same event. Graphical indicators 913, 918, and 924 represent the same event. Further, graphical indicators 915, 920, and 926 represent the same event.

In this illustrative example, an operator may enter user input that changes the display of primary time scale 908 and/or secondary time scale 910. As one illustrative example, the operator may slide primary time scale 908 and/or secondary time scale 910 to the left or right, in this depicted example, to change which months and/or days, respectively, are displayed in display 900.

In some illustrative examples, an operator may make a tactile selection of an event by, for example, tapping the graphical indicator displayed on timeline 906 or on map 902 corresponding to the event. A selection of an event may cause a new window (not shown) to be displayed in display 900. This new window (not shown) may display information about the particular event selected.

Figure 10:
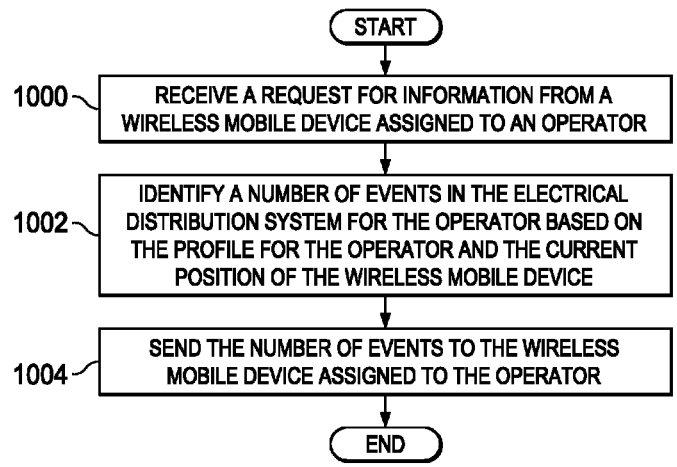
FIG. 10 is an illustration of a flowchart of a process for processing information for an electrical power system in accordance with an advantageous embodiment.

With reference now to FIG. 10, an illustration of a flowchart of a process for processing information for an electrical power system is depicted in accordance with an advantageous embodiment. The process illustrated in FIG. 10 may be implemented within electrical power system 100 in FIG. 1. In particular, this process may be implemented using situational awareness module 104 in FIG. 1.

The process begins by receiving a request for information from a wireless mobile device assigned to an operator (operation 1000). The request includes a profile for the operator and a current position of the operator with respect to an electrical distribution system in the electrical power system. In this illustrative example, the profile for the operator includes a role of the operator. The profile may also include a work schedule and/or an amount of experience for the operator.

The process identifies a number of events in the electrical distribution system for the operator based on the profile for the operator and the current position of the wireless mobile device (operation 1002). The process then sends the number of events to the wireless mobile device assigned to the operator (operation 1004), with the process terminating thereafter.

Figure 11:
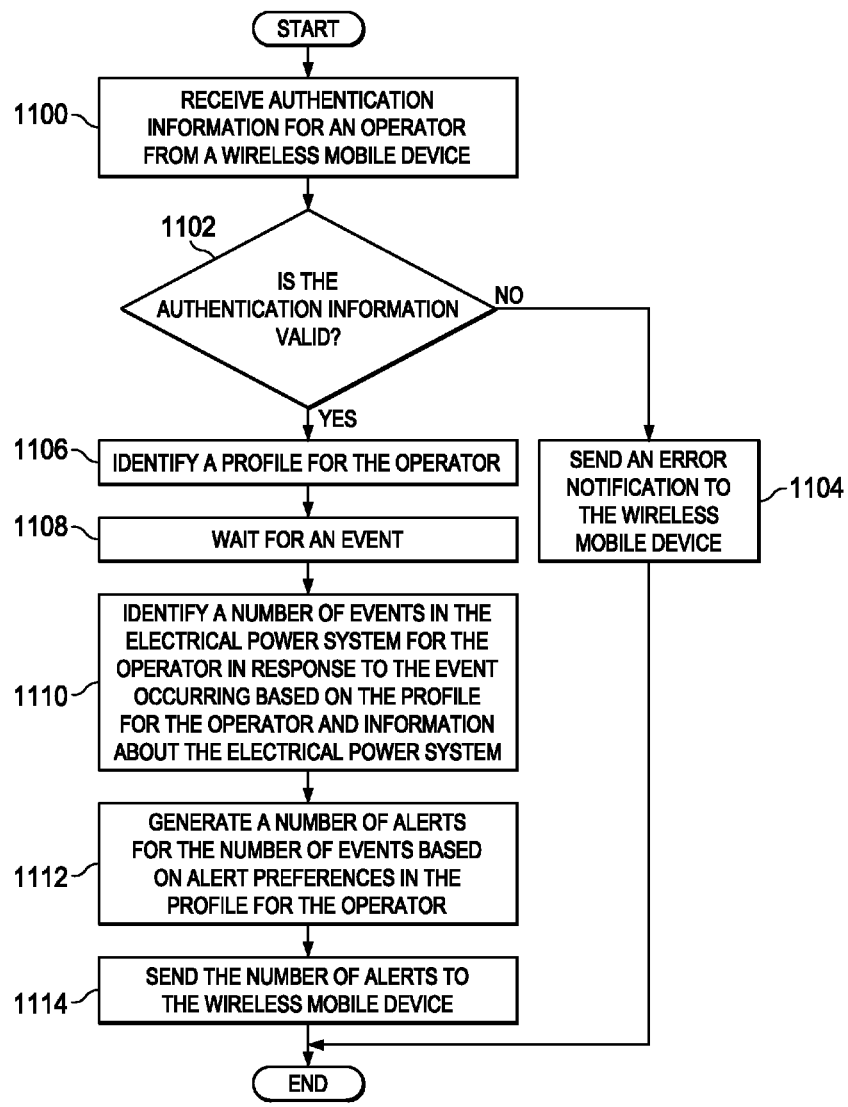
FIG. 11 is an illustration of a flowchart of a process for processing information for an electrical power system in accordance with an advantageous embodiment.

With reference now to FIG. 11, an illustration of a flowchart of a process for processing information for an electrical power system is depicted in accordance with an advantageous embodiment. The process illustrated in FIG. 11 may be implemented within electrical power system 100 in FIG. 1. In particular, this process may be implemented using situational awareness module 104 in FIG. 1.

The process begins by receiving authentication information for an operator from a wireless mobile device (operation 1100). The authentication information may include, for example, a profile for the operator, a username, a password, log in information, a certificate of credentials, biometric data, and/or other suitable biometric data.

The process determines whether the authentication information is valid (operation 1102). If the authentication information is not valid, the process sends an error notification to the wireless mobile device (operation 1104), with the process terminating thereafter.

Otherwise, the process identifies a profile for the operator (operation 1106). The profile may be provided in the authentication information received from the wireless mobile device and/or may be identified using the authentication information. For example, in operation 1106, the process may identify a profile for the operator using a username for the operator received in the authentication information.

Next, the process waits for an event (operation 1108). The event may be, for example, a lapse of a period of time, a request for information received from the wireless mobile device, a current position of the wireless mobile device meeting a number of criteria, a generation of a work order, and/or some other suitable event.

The process then identifies a number of events in the electrical power system for the operator in response to the event occurring based on the profile for the operator and information about the electrical power system (operation 1110). The information about the electrical power system may be received from, for example, an automated meter reading system, an outage management system, a customer information service system, a work management system, and/or other suitable sources.

In operation 1110, the number of events may be identified based on, for example, an area of operation for the operator, an area of interest for the operator, an area of responsibility for the operator, a current position of the wireless mobile device, additional input received in a request for information from the wireless mobile device, and/or other suitable information.

Thereafter, the process generates a number of alerts for the number of events based on alert preferences in the profile for the operator (operation 1112). The process sends the number of alerts to the wireless mobile device (operation 1114), with the process terminating thereafter.

Figure 12:
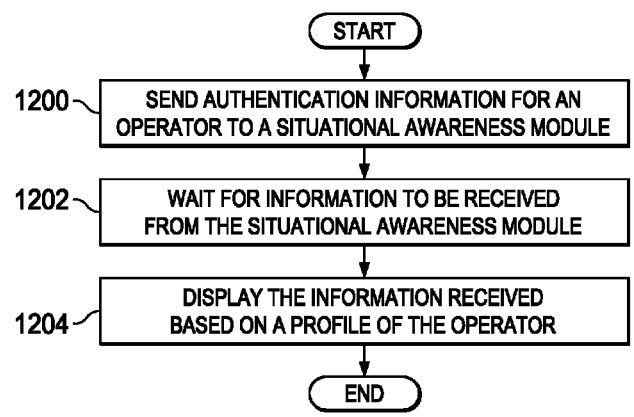
FIG. 12 is an illustration of a process for displaying information in accordance with an advantageous embodiment.

With reference now to FIG. 12, an illustration of a flowchart of a process for displaying information is depicted in accordance with an advantageous embodiment. The process illustrated in FIG. 12 may be implemented within electrical power system 100 in FIG. 1. In particular, this process may be implemented using wireless mobile device 106 in FIG. 1.

The process begins by sending authentication information for an operator to a situational awareness module (operation 1200). The process then waits for information to be received from the situational awareness module (operation 1202). In operation 1202, the information that is received may comprise at least one of an alert, an event, an error notification, and other types of information for the electrical distribution system in the electrical power system.

The process then displays the information received based on a profile of the operator (operation 1204), with the process terminating thereafter.

Figure 13:
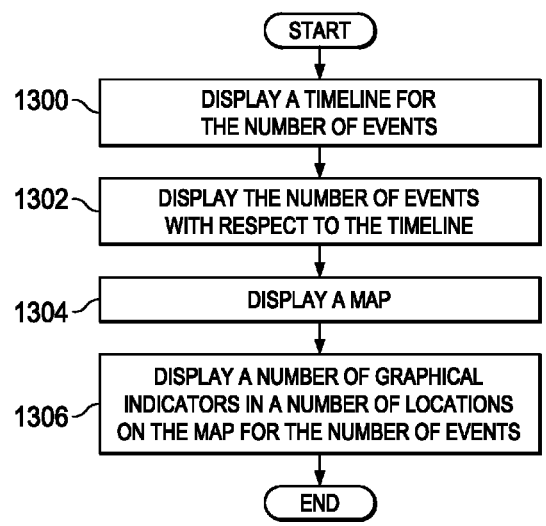
FIG. 13 is an illustration of a flowchart of a process for displaying information in accordance with an advantageous embodiment.

With reference now to FIG. 13, an illustration of a flowchart of a process for displaying information is depicted in accordance with an advantageous embodiment. The process illustrated in FIG. 13 is an example of a manner in which operation 1204 in FIG. 12 may be implemented when the information comprises a number of events.

The process begins by displaying a timeline for the number of events (operation 1300). The process then displays the number of events with respect to the timeline (operation 1302). Next, the process displays a map (operation 1304). The process displays a number of graphical indicators in a number of locations on the map for the number of events (operation 1306), with the process terminating thereafter.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 14, an illustration of a data processing system is depicted in accordance with an advantageous embodiment. In this illustrative example, data processing system 1400 is an example of a data processing system that may be used to implement one or more of number of computers 116 in computer system 114 in FIG. 1, one or more of the components in computer system 300 in FIG. 3, and/or processor unit 126 in wireless mobile device 106 in FIG. 1.

As depicted, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400.

In some instances, computer readable storage media 1424 may not be removable from data processing system 1400. In these examples, computer readable storage media 1424 is a physical or tangible storage device used to store program code 1418 rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal.

These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different advantageous embodiments may be implemented in a data processing system including components in addition to or in place of those illustrated for data processing system 1400. Other components shown in FIG. 14 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. With this type of implementation, program code 1418 may be omitted, because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1406, or a cache, such as found in an interface and memory controller hub that may be present in communications fabric 1402.

Thus, the different advantageous embodiments provide a method and apparatus for managing events in an electrical distribution system. In one advantageous embodiment, a number of events in the electrical distribution system is identified for an operator based on a profile for the operator. The wireless mobile device is assigned to the operator. The profile includes a role of the operator. The number of events is sent to the wireless mobile device assigned to the operator.

In this manner, the different advantageous embodiments provide a system for providing substantially real-time and up-to-date information to an operator performing operations in the field in an electrical power system. This system allows the operator to perform operations in the field more accurately and/or more efficiently as compared to currently available systems. Further, this type of system may reduce the time and/or effort needed for performing these operations as compared to currently available systems.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing events in an electrical distribution system, the method comprising:
    identifying a number of events in the electrical distribution system for an operator based on a profile for the operator, wherein a wireless mobile device is assigned to the operator and the profile includes a role of the operator;
    sending the number of events to the wireless mobile device assigned to the operator, the wireless mobile device including a camera and a display device; and
    displaying the number of events on the wireless mobile device, wherein displaying includes:
        identifying a view of the camera in the current position of the wireless mobile device;
        identifying a set of events from the number of events that have locations in the view of the camera in the current position of the wireless mobile device; and
        displaying a number of images from the view of the camera on the display device with a number of graphical indicators representing the set of events in locations in the number of images that correspond to the locations in the view of the camera for the set of events.

2. The method of claim 1, wherein the profile identifies at least one of the role of the operator, a work schedule for the operator, an area of responsibility for the operator, an area of operation for the operator, an area of interest for the operator, a user identifier, identity information, and display preferences of the operator.

3. The method of claim 1, wherein the number of events is used by the operator to perform a number of operations for the electrical distribution system.

4. The method of claim 3, wherein the step of identifying the number of events comprises:
    identifying the number of events in the electrical distribution system for the operator based on the profile for the operator and at least one of a current position of the wireless mobile device with respect to the electrical distribution system and a current time, wherein the wireless mobile device is assigned to the operator and the profile includes the role of the operator.

5. The method of claim 1 further comprising:
receiving a request for the information about the electrical distribution system from the wireless mobile device, wherein the request includes at least one of the profile for the operator, a current position of the wireless mobile device, a date, a time, and a work order.

6. The method of claim 1 further comprising:
receiving the events from nodes in the electrical distribution system.

7. The method of claim 1, wherein the number of events comprises at least one of
a trouble ticket, a service request, an undesired state for a piece of equipment, a generation of a work order to perform a maintenance operation, a detection of a parameter being greater than a selected threshold, a completed task, an in-progress task, a stopped task, and an uncompleted task.

8. A method for managing events in an electrical distribution system, the method comprising:
receiving the information about the electrical distribution system at a wireless mobile device assigned to an operator, wherein the information received is based on a profile for the operator and a current position of the wireless mobile device with respect to the electrical distribution system and wherein the profile includes a role of the operator, wherein the information comprises at least one of a number of events, position data, and a work order modification; and
displaying the information on the wireless mobile device that includes a camera and a display device, wherein displaying the information on the wireless mobile device comprises:
identifying a view of the camera in the current position of the wireless mobile device;
identifying a set of events from the number of events that have locations in the view of the camera in the current position of the wireless mobile device; and
displaying a number of images from the view of the camera on the display device with a number of graphical indicators representing the set of events in locations in the number of images that correspond to the locations in the view of the camera for the set of events.

9. The method of claim 8 wherein the step of displaying the information on the wireless mobile device comprises:
displaying a map of the electrical distribution system on a display device in the wireless mobile device; and
displaying the number of events on the map displayed on the display device.

10. The method of claim 9, wherein the step of displaying the information on the wireless mobile device further comprises:
displaying an icon on the map in a location on the map, wherein the icon represents the wireless mobile device and the location on the map corresponds to the current position of the wireless mobile device.

11. The method of claim 8 further comprising:
sending a request for the information about the electrical distribution system to a situational awareness module, wherein the request includes a profile for the operator and the current position of the wireless mobile device.

12. A method for managing events in an electrical distribution system, the method comprising:
receiving the information about the electrical distribution system at a wireless mobile device assigned to an operator, wherein the information received is based on a profile for the operator and a current position of the wireless mobile device with respect to the electrical distribution system and wherein the profile includes a role of the operator, wherein the information comprises a number of events; and
displaying the information on the wireless mobile device, wherein displaying comprises:
displaying a first number of graphical indicators for the number of events on a primary time scale for a timeline in a graphical user interface; and
displaying a second number of graphical indicators for the number of events on a secondary time scale for the timeline in the graphical user interface, wherein the secondary time scale is a vernier time scale and wherein each of the second number of graphical indicators corresponds to one of the first number of graphical indicators.

13. The method of claim 12, wherein the step of displaying the information on the wireless mobile device further comprises:
displaying a third number of graphical indicators for the number of events in a number of locations on a map displayed in the graphical user interface, wherein each of the third number of graphical indicators corresponds to at least one of the first number of graphical indicators and one of the second number of graphical indicators.

14. The method of claim 12, wherein the second number of graphical indicators is for a first portion of the number of events and further comprising:
receiving user input changing a display of the secondary time scale, wherein changing the display of the secondary time scale causes a third number of graphical indicators for a second portion of the number of events to be displayed on the secondary time scale in the graphical user interface.

15. A wireless mobile device comprising:
a display device;
a wireless communications unit;
a processor unit connected to the display device and the wireless communications unit, wherein the processor unit is configured to:
receive a number of events in the electrical distribution system for an operator based on a profile for the operator, wherein the wireless mobile device is assigned to the operator and the profile includes a role of the operator; and
display the number of events, wherein in being configured to display the processor unit is further configured to:
identify a view of the camera in the current position of the wireless mobile device;
identify a set of events from the number of events that have locations in the view of the camera in the current position of the wireless mobile device; and
display a number of images from the view of the camera on the display device with a number of graphical indicators representing the set of events in locations in the number of images that correspond to the locations in the view of the camera for the set of events.

16. The wireless mobile device of claim 15 further comprising:
a position identification system configured to identify a current position of the wireless mobile device with respect to the electrical distribution system, wherein the information is based on the profile for the operator and the current position of the wireless mobile device.

\* \* \* \* \*